US012271022B2

(12) United States Patent
Rizvi et al.

(10) Patent No.: US 12,271,022 B2
(45) Date of Patent: Apr. 8, 2025

(54) ILLUMINATION PANEL DEVICE

(71) Applicant: Razer (Asia-Pacific) Pte. Ltd., Singapore (SG)

(72) Inventors: Farrukh Raza Rizvi, Singapore (SG); Wooi Liang Chin, Singapore (SG); Yi Wei Lim, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/262,693

(22) PCT Filed: Feb. 25, 2021

(86) PCT No.: PCT/SG2021/050094
§ 371 (c)(1),
(2) Date: Jul. 24, 2023

(87) PCT Pub. No.: WO2022/182284
PCT Pub. Date: Sep. 1, 2022

(65) Prior Publication Data
US 2024/0077667 A1    Mar. 7, 2024

(51) Int. Cl.
*F21V 8/00* (2006.01)
(52) U.S. Cl.
CPC ......... *G02B 6/0083* (2013.01); *G02B 6/0051* (2013.01); *G02B 6/0068* (2013.01)
(58) Field of Classification Search
CPC .. G02B 6/0083; G02B 6/0051; G02B 6/0068; F21V 19/001; F21V 29/74; F21V 29/70; F21V 15/01
See application file for complete search history.

(56) References Cited

U.S. PATENT DOCUMENTS 8,476,844 B2    7/2013  Hancock et al.
9,028,127 B2 *  5/2015  Kim ..................... G02B 6/0063
                                                362/616
(Continued)

FOREIGN PATENT DOCUMENTS

CN    101169556 A    4/2008
CN    204187402 U    3/2015
(Continued)

OTHER PUBLICATIONS

Xie et al., "Wide Color Gamut Backlight for Liquid Crystal Displays Using Three-Band Phosphor-Converted White Light-Emitting Diodes," Applied Physics Express 2 (2009); (https://www.researchgate.net/publication/239005874_Wide_Color_Gamut_Backlight_for_Liquid_Crystal_Displays_Using_Three-Band_Phosphor-Converted_White_Light-Emitting_Diodes) (4 pages).

(Continued)

*Primary Examiner* — Arman B Fallahkhair
(74) *Attorney, Agent, or Firm* — Polsinelli PC

(57) ABSTRACT

An illumination panel device includes a housing, a first circuit board, a second circuit board, and a light guide. The housing includes a frame coupled to a rear cover. The frame defines an opening. The first circuit board includes a plurality of white light emitters. The first circuit board is coupled to the frame such that the plurality of white light emitters are arranged around the opening. The second circuit board includes a plurality of multi-color light emitters. The second circuit board is coupled to the frame such that the plurality of multi-color light emitters are arranged around the opening. The light guide has opposite front and back surfaces. The light guide is arranged in the opening with the back surface facing the rear cover. The light guide is optically coupled to at least the plurality of white light emitters through peripheral edges of the light guide.

19 Claims, 15 Drawing Sheets

(56) References Cited

U.S. PATENT DOCUMENTS

| | | | |
|---|---|---|---|
| 9,400,347 B2 | 7/2016 | Sugiyama et al. | |
| 9,500,355 B2* | 11/2016 | Kuenzler | F21V 29/70 |
| 9,817,179 B2* | 11/2017 | Azuma | F21V 7/0066 |
| 9,964,696 B2* | 5/2018 | Kim | G02B 6/0026 |
| 10,240,734 B1 | 3/2019 | Hwang | |
| 10,309,632 B2* | 6/2019 | Tickner | F21V 19/001 |
| 10,317,019 B2 | 6/2019 | Li et al. | |
| 10,704,746 B2* | 7/2020 | Jeong | H05B 45/10 |
| 10,793,065 B2 | 10/2020 | Dominick et al. | |
| 10,871,281 B2* | 12/2020 | Marinus | G02B 6/0036 |
| 11,280,459 B2* | 3/2022 | Tickner | F21V 29/15 |
| 2010/0027293 A1* | 2/2010 | Li | G02B 6/0036 |
| | | | 362/619 |
| 2010/0165237 A1 | 7/2010 | Jung | |
| 2011/0090426 A1* | 4/2011 | Choi | G02B 6/0091 |
| | | | 362/633 |
| 2012/0020108 A1* | 1/2012 | Chang | G02B 6/0035 |
| | | | 362/555 |
| 2012/0243256 A1* | 9/2012 | Lee | G02B 6/0023 |
| | | | 362/609 |
| 2013/0003369 A1 | 1/2013 | Hiraoka et al. | |
| 2015/0167952 A1 | 6/2015 | Lee | |
| 2015/0261042 A1 | 9/2015 | Sugaya | |
| 2017/0068038 A1 | 3/2017 | Danesh et al. | |
| 2017/0272720 A1 | 9/2017 | Oki | |
| 2019/0032897 A1 | 1/2019 | Cao | |
| 2020/0154538 A1 | 5/2020 | Smith et al. | |

FOREIGN PATENT DOCUMENTS

| | | |
|---|---|---|
| CN | 206130578 U | 4/2017 |
| CN | 105261613 B | 7/2018 |
| CN | 207921975 U | 9/2018 |
| CN | 110610930 A | 12/2019 |
| CN | 210511122 U | 5/2020 |
| CN | 210803931 U | 6/2020 |
| CN | 210921321 U | 7/2020 |
| DE | 202018107426 U1 | 1/2019 |
| EP | 3697177 A1 | 8/2020 |
| JP | 2007141548 A | 6/2007 |
| JP | 5040194 B2 | 10/2012 |
| JP | 2019068388 A | 4/2019 |
| KR | 20080106677 A | 12/2008 |
| KR | 101404650 B1 | 6/2014 |
| KR | 101885929 B1 | 8/2018 |
| WO | 2013/031676 A1 | 3/2013 |
| WO | 2020152068 A1 | 7/2020 |

OTHER PUBLICATIONS

European search opinion; dated Apr. 4, 2024, application # 21928268.8.

\* cited by examiner

ILLUMINATION PANEL DEVICE

TECHNICAL FIELD

Various embodiments relate to illumination panel devices.

BACKGROUND

With the increasing popularity of social media applications that showcase photos and videos, many social media users are seeking ways to enhance the quality of their photos and videos. One method to do would be to set up the appropriate background lighting, like in a photo studio. However, such professional photography lighting equipment are bulky and expensive. As such, there is a need for a portable lighting equipment that may address the needs of home users.

SUMMARY

According to various embodiments, there may be provided an illumination panel device. The illumination panel device may include a housing, a first circuit board, a second circuit board, and a light guide. The housing may include a frame coupled to a rear cover. The frame may define an opening. The first circuit board may include a plurality of white light emitters. The first circuit board may be coupled to the frame such that the plurality of white light emitters are arranged around the opening. The second circuit board may include a plurality of multi-color light emitters. The second circuit board may be coupled to the frame such that the plurality of multi-color light emitters are arranged around the opening. The light guide has opposite front and back surfaces. The light guide may be arranged in the opening with the back surface facing the rear cover. The light guide may be optically coupled to at least the plurality of white light emitters through peripheral edges of the light guide.

Additional features for advantageous embodiments are provided in the dependent claims.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1A:
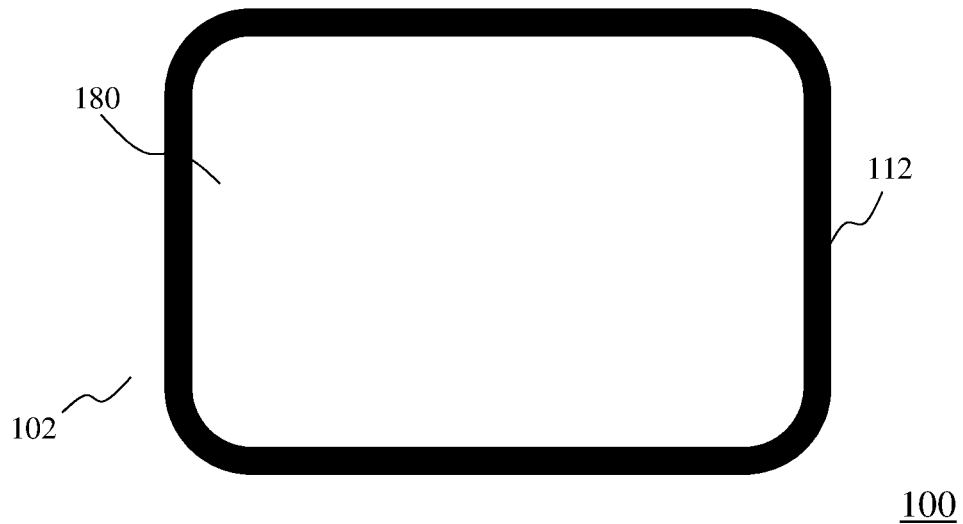
FIGS. 1A to 1D show various external views of an illumination panel device according to various embodiments.

It will be understood that any property described herein for a specific device may also hold for any device described herein. Furthermore, it will be understood that for any device described herein, not necessarily all the components described must be enclosed in the device, but only some (but not all) components may be enclosed.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In order that the invention may be readily understood and put into practical effect, various embodiments will now be described by way of examples and not limitations, and with reference to the figures.

According to various embodiments, an illumination panel device may be provided. The illumination panel device may include a lighting region that may light up with white light, for example, warm white light or cool white light. Additionally, or alternatively, the lighting region may light up with a plurality of colors, for example, using red-green-blue (RGB) light emitting diodes (LED). The lighting region may provide lighting effect that is suitable for home photography. For example, a user may use the illumination panel device as a lightbox, to generate background light for taking photographs of objects. The resulting photographs may look like professional photographs that show the objects clearly, with a high contrast from the background. The user may also use the illumination panel device for broadcasting applications. For example, the user may set up one or more of the illumination panel devices behind or around himself, to create the effect of studio lighting, when he is recording or broadcasting a video stream of himself. The illumination panel device may provide a portable and affordable option to create professional lighting effects, at the convenience of one's own home.

FIGS. 1A to 1D show various external views of an illumination panel device 100 according to various embodiments. The external views show a front view in FIG. 1A, a perspective view in FIG. 1B, a side view in FIG. 1C, and a bottom view in FIG. 1D.

FIG. 1A which shows a front side of the illumination panel device 100. The illumination panel device 100 may include a housing 102. The housing 102 may include a frame 112. The frame 112 may surround a lighting region 180 of the illumination panel device 100. The illumination panel device 100 may be configured to light up the lighting region 180 with a white light, for example, cool white light or warm white light. Warm white light may refer to white light with a correlated color temperature (CCT) of 1000 to 4000K, while cool white light may refer to white light with a CCT of 4000 to 7000K. The illumination panel device may also be configured to light up the lighting region 180 with colored light, for example, a single-color static display, a multi-color static display, a single-color lighting sequence, or a multi-color lighting sequence. Colored light may refer to light having colors other than white, for example, red, green and blue, and any combination thereof. The lighting region 180 may also light up with both the white light and the colored light concurrently. The lighting region 180 is a portion of a light guide 126 (not labelled in FIG. 1A), where a front surface of the light guide 126 is visible through an opening 110 (not labelled in FIG. 1A) of the frame 112. The light guide 126 will be described in further details with respect to FIGS. 2 and 3. The frame 112 will be described in further details with respect to FIGS. 4A and 4B.

Figure 1B:
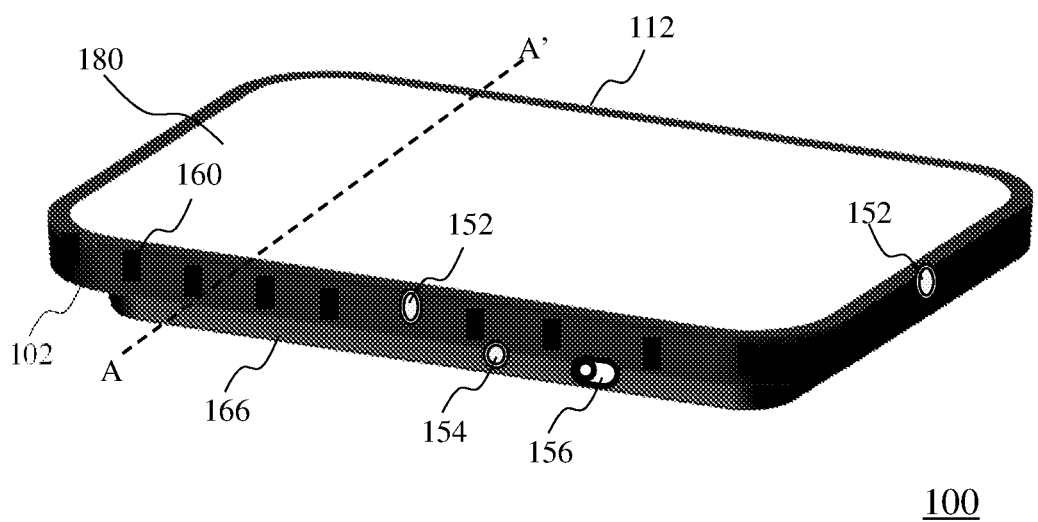
Figure 1C:
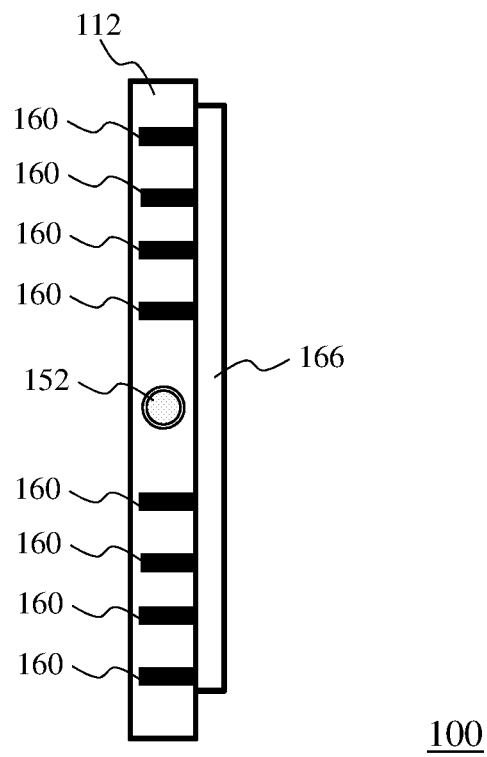
Figure 1D:
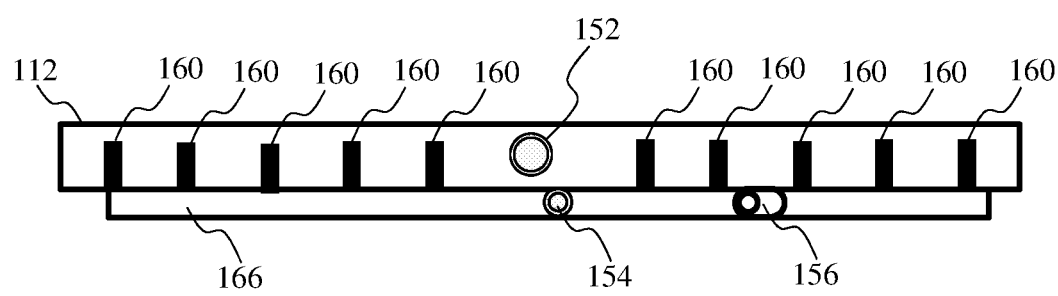

Referring to FIGS. 1B, 1C and 1D, the frame 112 may include a plurality of air vents 160 arranged along a perimeter of the frame 112. The plurality of vents 160 may be provided on at least one side of the frame 112. The plurality of air vents 160 may provide air circulation to heat dissipation fins within the illumination panel device 100. The air vents 160 are not limited to the shapes shown in the figures, as long as the air vents 160 facilitate exchange of air between inside of the housing 102 and outside of the housing 102.

The frame 112 may also include an aperture 152 on at least one side of the frame 112. The illumination panel device 100 may be detachably coupled to a mounting stand, through the aperture(s) 152. The aperture 152 may receive a mounting member. For example, the aperture 152 may be a threaded hole, while the mounting member may be a threaded screw. While FIGS. 1B to 1D show the aperture 152 being disposed on the right side (from the front view) and the bottom side of the illumination panel device 100, the aperture 152 may be provided on any other side of the illumination panel device 100.

The illumination panel device 100 may further include a power compartment 166. The power compartment 166 may be provided on a rear side of the illumination panel device 100. The rear side may be opposite to the front side of the illumination panel device 100. The power compartment 166 may house a power source (not shown in the figures), such as a battery, for powering the illumination panel device 100. The power compartment 166 may include a power connector 154. The power source may be re-chargeable, via the power connector 154. The power compartment 166 may include a switch 156. The switch 156 may be operable, to selectively turn on and turn off the illumination panel device 100. While FIGS. 1B and 1D shows the power connector 154 and the switch 156 being disposed on a bottom side of the illumination panel device 100, the power connector 154 and the switch 156 may be provided on any other side of the illumination panel device 100.

Figure 2A:
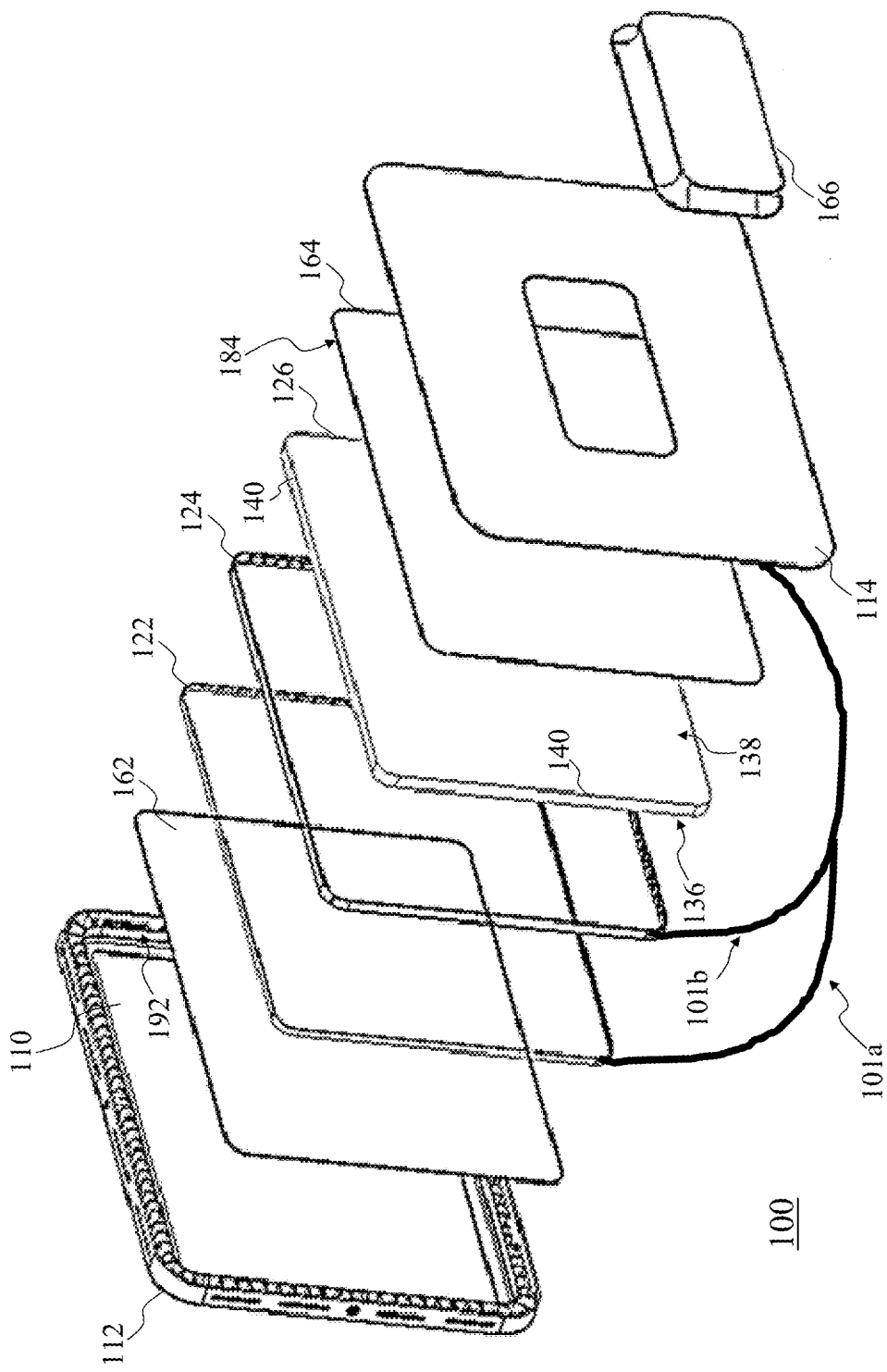
FIG. 2A shows an exploded view of the illumination panel device of FIG. 1A.

FIG. 2A shows an exploded view of the illumination panel device 100. In addition to the frame 112, the housing 102 also includes a rear cover 114. The frame 112 may be coupled to the rear cover 114 to enclose internal components of the illumination panel device 100. The rear cover 114 may have a thickness of about 1.5 mm.

The frame 112 may define an opening 110. In other words, the frame 112 may surround the opening 110. The frame 112 has a front end 330 and an opposite back end 332 (labelled in FIG. 3). The back end 332 faces the rear cover 114. The opening 110 may be smaller at the front end 330 than at the back end 332. The internal components may further include a light guide 126. The light guide 126 may be arranged in the opening 110 with the back surface 138 facing the rear cover 114. The light guide 126 may be larger than the opening 110 at the front end of the frame 112, The light guide 126 may be retained within the housing 102 by the front end of the frame 112. The light guide 126 may be wholly retained within the opening 110 of the frame 112.

The internal components may include a first circuit board 122 and a second circuit board 124. The first circuit board 122 may include a plurality of white light emitters 132. The first circuit board 122 may be a printed circuit board (PCB), for example, an aluminum PCB. The first circuit board 122 may have a thickness of about 0.8 mm. The white light emitters 132 may be light emitting diodes (LED) configured to emit white light. The second circuit board 124 may include a plurality of multi-color light emitters 134 configured to emit light in various colors, for example, including red, blue, green, or combinations thereof. The second circuit board 124 may be a PCB, for example, an aluminum PCB. The second circuit board 124 may have a thickness of about 0.8 mm. The multi-color light emitters 134 may include red-green-blue (RGB) LEDs. In some embodiments, each multi-color light emitter 134 may include a red LED, a green LED and a blue LED packaged into a single light emitter package. Each of the first circuit board 122 and the second circuit board 124 may be coupled to the frame 112 such that both the plurality of white light emitters 132 and the plurality of multi-color light emitters 134 are arranged around the opening 110.

The light guide 126 has a front surface 136 and a back surface 138 opposite to the front surface. The light guide 126 may be arranged in the opening 110 with the back surface 138 facing the rear cover 114. The light guide 126 may be larger than the opening 110 at the front end of the frame 112, The light guide 126 may be retained within the housing 102 by the front end of the frame 112. The light guide 126 may be optically coupled to both the plurality of white light emitters 132 and the plurality of multi-color light emitters 134 through peripheral edges 140 of the light guide 126, such that the light guide 126 may form the lighting region 180 as described with respect to FIG. 1A. The peripheral edges 140 may be transverse, or perpendicular, to one or both of the front surface 136 and the back surface 138. The light guide 126 may be about 10 mm in thickness. In other words, the peripheral edges 140 may be about 10 mm in height. Both the first circuit board 122 and the second circuit board 124 may be arranged on an inner edge 192 of the frame 112. The inner edge 192 may surround the opening 110. Consequently, the plurality of white light emitters 132 and the plurality of multi-color light emitters 134 may face the peripheral edges 140 of the light guide 126. The optical coupling between both the white light emitters 132 and the multi-color light emitters 134, and the light guide 126, will be described in further details with respect to FIG. 3. The material composition of the light guide 126 may include optical grade polymethyl methacrylate (PMMA) or polycarbonate (PC).

The internal components may further include a primary diffuser 162. The primary diffuser 162 may be arranged adjacent to the light guide 126 in the opening 110 of the frame 112, between the light guide 126 and the frame 112. The primary diffuser 162 may be configured to diffuse light released from the front surface 136 of the light guide 126. The light emitted from the front surface 136 of the light guide 126 may be brighter along the boundary of the front surface 136 and dimmer at a center of the front surface 136. The primary diffuser 162 may smoothen the appearance of the light released from the light guide 126, such that the diffused light appears to be emitted at least substantially uniformly from the lighting region 180. The primary diffuser 162 may have a thickness of about 0.5 mm to about 1.5 mm, for example, the thickness may be 1 mm. The material composition of the primary diffuser 162 may include polyethylene terephthalate (PET) or polycarbonate (PC).

The internal components may further include a reflector 164 arranged between the light guide 126 and the rear cover 114. The reflector 164 may have a reflective surface 184 facing the light guide 126. The reflector may have a thickness in a range of about 0.3 mm to 0.5 mm. The material composition of the reflector 164 may include PET, or may include plastic-coated paper. The reflector 164 will be described in further details with respect to FIG. 3.

The light illumination panel device 100 may further include the power compartment 166. The power compartment 166 may be coupled to the rear cover 114, and may protrude out of the frame 112. The power compartment 166 may include a power source that may be configured to supply electrical power to each of the first circuit board 122 and the second circuit board 124. The power compartment 166 may further include a power compartment housing made of an electrically-insulating material.

The illumination panel device 100 may further include a first controller circuit (not shown in the figures) and a second controller circuit (not shown in the figures). The first controller circuit may be configured to control the plurality of white light emitters 132, for example, individually control each white light emitter of the plurality of white light emitters 132. The first controller circuit may be part of the first circuit board 122. The second controller circuit may be configured to control the plurality of multi-color light emitters 134. The second controller circuit may be part of the second circuit board 124. The second controller circuit may individually control each multi-color light emitter 134 of the plurality of multi-color light emitters 134, for example, to generate a dynamic lighting effect, such as a lighting sequence. The second circuit board 124 may include addressable LEDs which may include a LED driver. The LED driver in each LED may pass down the RGB control information from one LED to another LED digitally. The multi-color light emitters 134 may be configured to generate up to 16.8 million colors.

In an alternative embodiment, the white light emitters and the multi-color light emitters may be provided on a single circuit board, instead of being separately provided on the first circuit board 122 and the second circuit board 124.

According to various embodiments, the frame 112 may include a transparent layer (not shown in the figures) arranged in the opening 110, to overlay the primary diffuser 162. The transparent layer may protect the primary diffuser 162 and other internal components of the illumination panel device 100, from environmental elements like dust and moisture. The transparent layer may protect the primary diffuser 162 from being scratched or damaged.

Figure 2B:
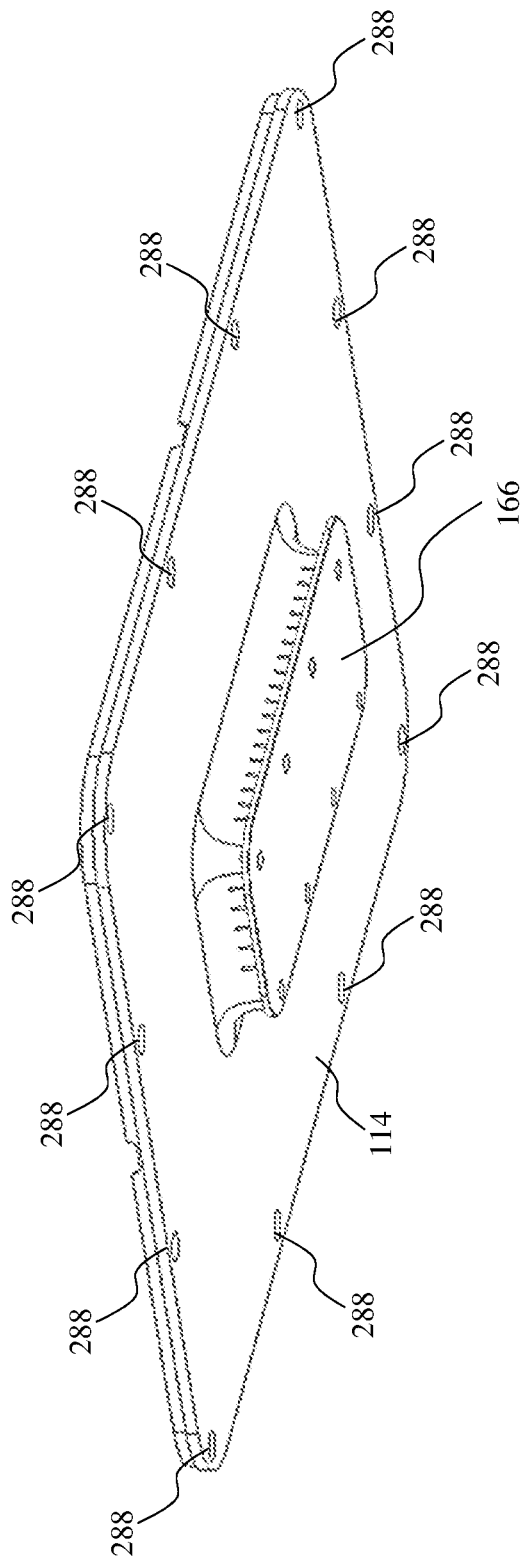
FIG. 2B shows an embodiment of the rear cover of the illumination panel device of FIG. 1A.

According to various embodiments, the rear cover 114 and the power compartment 166 may be formed as an integral component, like shown in FIG. 2B.

According to various embodiments, the rear cover 114 may further include a plurality of air venting holes 288, like shown in FIG. 2B. The air venting holes 288 may be provided along the periphery of the rear cover 114. The air venting holes 288 may facilitate release of heat from within the illumination panel device 100.

Figure 3:
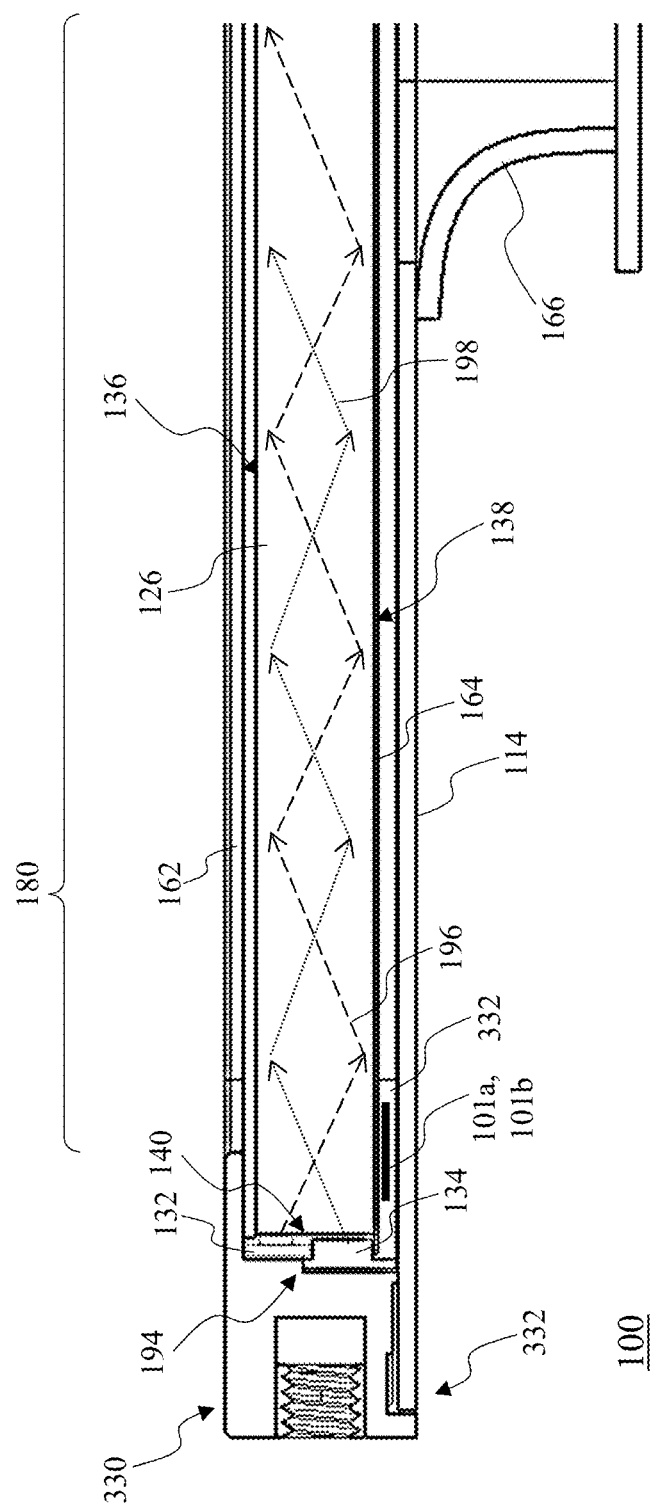
FIG. 3 shows a cross-sectional view of the illumination panel device of FIG. 1A.

FIG. 3 shows a cross-sectional view of the illumination panel device 100, cut along the line A-A' shown in FIG. 1B. Both the plurality of white light emitters 132 and the plurality of multi-color light emitters 134 may be coupled to the inner edge 192 of the frame 112, and disposed adjacent to the peripheral edge 140 of the light guide 126. The light guide 126 may be configured to receive light from at least the plurality of white light emitters 132 through the peripheral edges 140 and further configured to release the received light through the front and back surfaces, 136, 138.

When the white light emitters 132 emit white light 196, the white light 196 may enter the light guide 126 through the peripheral edge 140. The light guide 126 may propagate the white light 196 across the light guide 126, while simultaneously releasing part of the white light 196 through its front surface 136 and its rear surface 138. When the white light 196 exits the light guide 126 through the rear surface 138, it is reflected back into the light guide 126 by the reflector 164, towards the primary diffuser 162. When the white light 196 exits the light guide 126 through the front surface 136, it enters the primary diffuser 162 which refracts the white light 196, so that the white light 196 that exits the primary diffuser 162 appears to be at least substantially uniform in brightness across the lighting region 180. Similarly, when the multi-color light emitters 134 emit colored light 198, the colored light 198 may enter the light guide 126 through the peripheral edge 140. The light guide 126 may propagate the colored light 198 across the light guide 126, while simultaneously releasing part of the colored light 198 through its front surface 136 and its rear surface 138. When the colored light 198 exits the light guide 126 through the rear surface 138, it is reflected back into the light guide 126 by the reflector 164, towards the primary diffuser 162. When the colored light 198 exits the light guide 126 through the front surface 136, it enters the primary diffuser 162 which refracts the colored light 198, so that the colored light 198 that exits the primary diffuser 162 appears to be at least substantially uniform in brightness across the lighting region 180. Different from the white light emitters 132, the plurality of multi-color light emitters 134 may emit different colors, for example, a sub-set of the plurality of multi-color light emitters 134 may be emitting red, a sub-set of the plurality of multi-color light emitters 134 may be emitting green, while another sub-set of the plurality of multi-color light emitters 134 may be emitting blue. Consequently, the lighting region 180 may display a multitude of colors, and these different colors may be partially blended due to the refraction in the primary diffuser 162. For example, a region of the lighting region may display red, a second region may display blue, while a region between the first and second regions may display purple which is a blend of red and blue.

Still referring to FIG. 3, the opening 110 in the frame 112 may provide sufficient space 332, to further accommodate at least one electrical cable between the reflector 164 and the rear cover 114. For example, an electrical cable 101a connecting the first circuit board 122 to the power source, and an electrical cable 101b connecting the second circuit board 124 to the power source, may be disposed within the space 332. These electrical cables (101a, 101b) may preferably be flat cables.

Figure 4A:
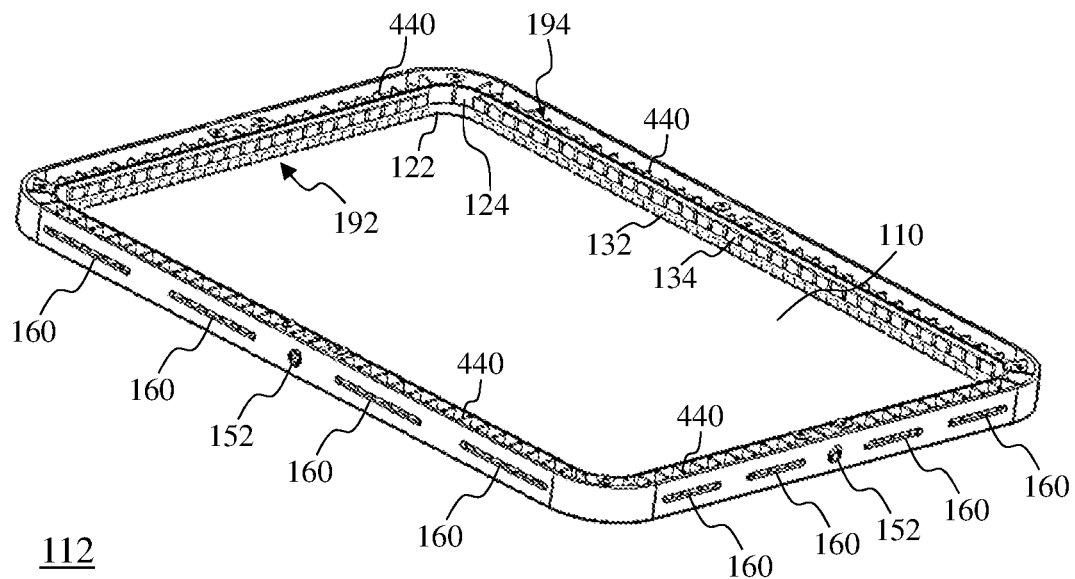
FIGS. 4A and 4B show the frame of the illumination panel device of FIG. 1A.
Figure 4B:
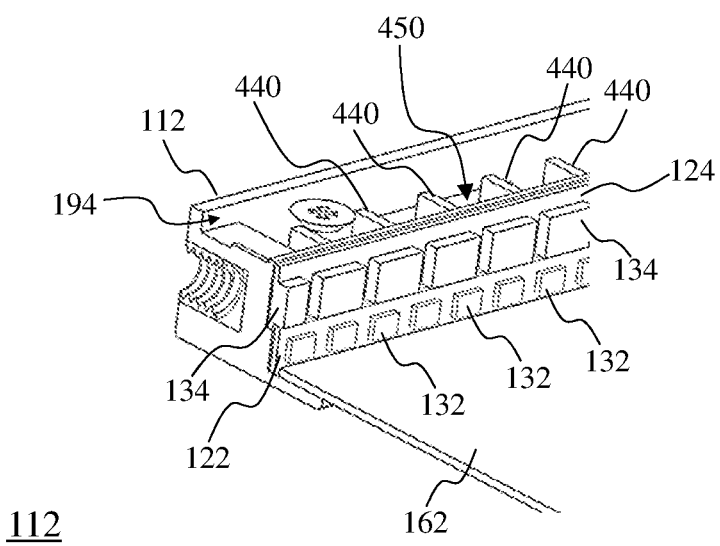
Figure 5A:
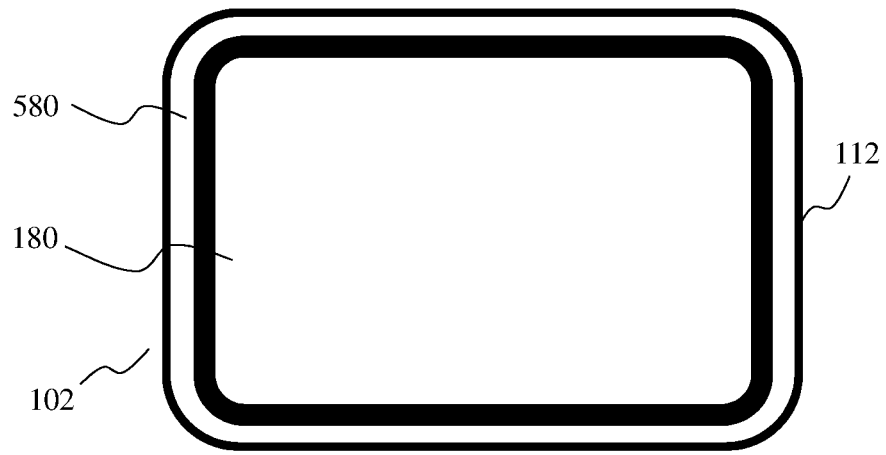
FIGS. 5A to 5D show various external views of an illumination panel device according to various embodiments.
Figure 5B:
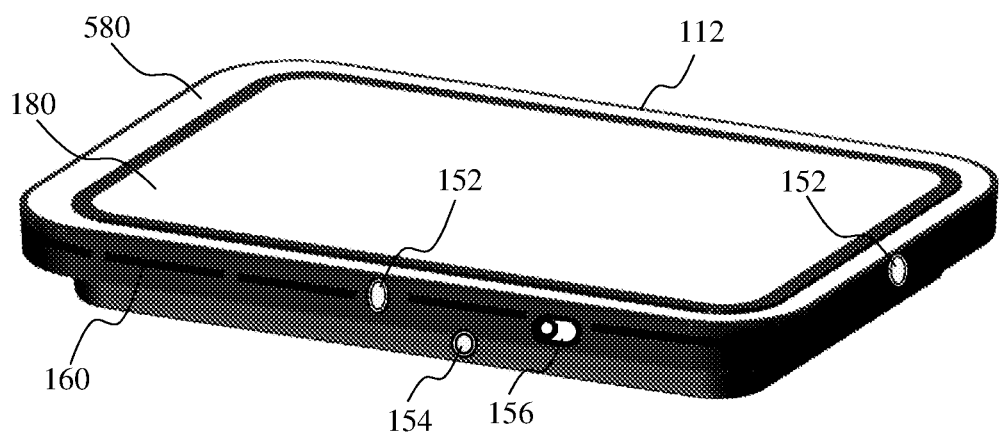
Figure 5C:
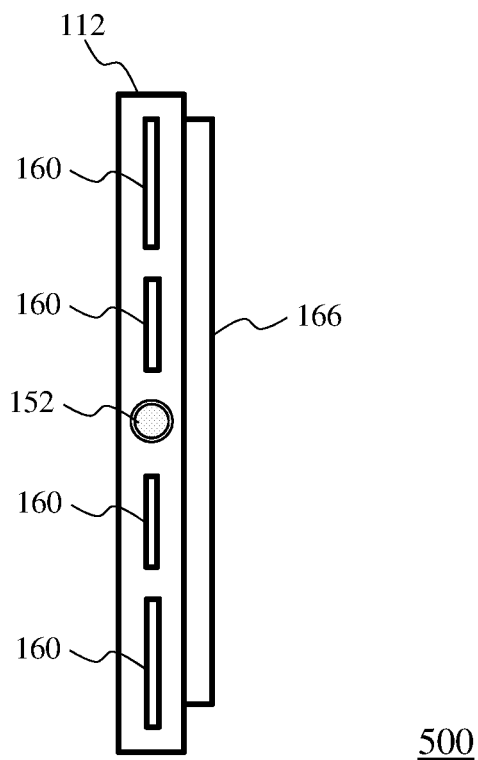
Figure 5D:
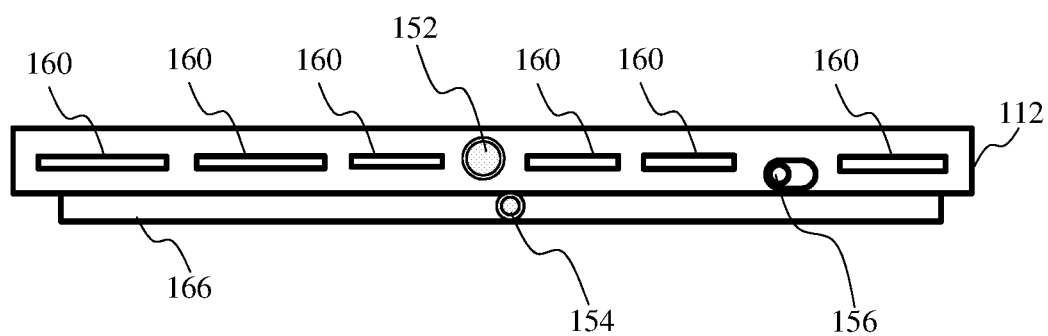

FIGS. 4A and 4B show the frame 112 of the illumination panel device 100. Referring to FIG. 4A, the first circuit board 122 and the second circuit board 124 may be lined along the inner edge 192 of the frame 112. Each of the first circuit board 122 and the second circuit board 124 may be a long strip of PCB, that is bent to conform to the inner edge 192 of the frame 112. Each of the first circuit board 122 and the second circuit board 124 may surround the opening 110. The second circuit board 124 may be arranged adjacent to the first circuit board 122 on the inner edge 192 of the frame 112. The plurality of white light emitters 132 may be arranged in a single row, along a length of the first circuit board 122. Similarly, the plurality of multi-color light emitters 124 may be arranged in a single row, along a length of the second circuit board 124. The white light emitters 132 and the multi-color light emitters 134 may face away from the inner edge 192, such that they face the peripheral edges 140 of the light guide 126. The first circuit board 122 may include, for example, 160 pieces of white LEDs. The second circuit board 124 may include, for example, 116 pieces of red-green-blue LEDs. The frame 112 may include a plurality of heat dissipation fins 440. The first circuit board 122 and the second circuit board 124 may be coupled to the inner edge 192 of the frame 112 using an adhesive. The adhesive may be a thermally conductive adhesive, so that the heat generated by the circuit boards may be effectively conducted away to the heat dissipation fins 440.

FIG. 4B shows a magnified view of a section of the frame 112. The heat dissipation fins 404 may extend from the inner edge 192 that is adjacent to the opening 110, towards an outer edge 194 of the frame 112. The heat dissipation fins 440 may abut the outer edge 194, or in other embodiments, be proximate to, but not in contact with, the outer edge 194. The frame 112 may include a trough along its perimeter. An opening of the trough may face the rear cover 114. The inner edge 192 and the outer edge 194 may be opposing walls of the trough. The heat dissipation fins 440 may be disposed within the trough, along the perimeter of the frame 112. There may be a gap 450 between every two heat dissipation fins 440. The gaps 450 may facilitate air flow between the plurality of heat dissipation fins 440.

The heat dissipation fins 440 may be configured to receive heat generated by at least one of the first circuit board 122 and the second circuit board 124 through the inner edge 192. The heat dissipation fins 440 may be further configured to conduct the received heat, to transfer the heat travels from the inner edge 192 to at least the air in the gap 450. The heat dissipation fins 440 may also conduct the received heat to the outer edge 194. The outer edge 194 may have air vents 160 formed in it, that allows the heated air in the gap 450 to flow out, and also for cool air external to the housing 102 to enter the gap 450.

According to various embodiments, the first circuit board 122 may be arranged at a same vertical position along all four sides of the inner edge 192, such that the white light emitters 132 arranged on a first side of the frame 112 directly face, in other words, are vertically aligned with, the white light emitters 132 arranged on a second side of the frame 112, wherein the second side opposes the first side. The vertical direction may be defined as a direction out of the plane of the illumination panel device 100. Similarly, the second circuit board 124 may be arranged at a same vertical position along all four sides of the inner edge 192, such that the multi-color light emitters 134 arranged on the first side of the frame 112 directly face, in other words, are vertically aligned with, the multi-color light emitters 134 arranged on the second side of the frame 112. The white light emitters 132 on opposing sides of the frame 112 may be aligned, while the multi-color light emitters 134 on opposing sides of the frame 112 may be aligned. Consequently, mixing of light emitted by the white light emitters 132 and the multi-color light emitters 134 may be minimized.

FIGS. 5A to 5D show various external views of an illumination panel device 500 according to various embodiments. The external views show include a front view in FIG. 5A, a perspective view in FIG. 5B, a side view in FIG. 5C, and a bottom view in FIG. 5D. For brevity, identical components between the illumination panel devices 100 and 500 are not described again.

The illumination panel device 500 may include a housing 102 that includes a frame 512 and a rear cover 114. Similar to the illumination panel device 100, the illumination panel device 500 may include a lighting region 180 that is surrounded by the frame 512. Differences between the frame 512 of the illumination panel device 500 and the frame 112 of the illumination panel device 100 will be described in further details with respect to FIGS. 8A and 8B.

The illumination panel device 500 may further include a secondary lighting region 580 around the lighting region 180. The lighting region 180 may be illuminated with a white light, for example, cool white light or warm white light, while the secondary lighting region 580 may be illuminated with colored light, for example, a single-color static display, a multi-color static display, a single-color lighting sequence, or a multi-color lighting sequence. The lighting region 180 and the secondary lighting region 580 may be lit up concurrently, or at different timings.

Figure 6:
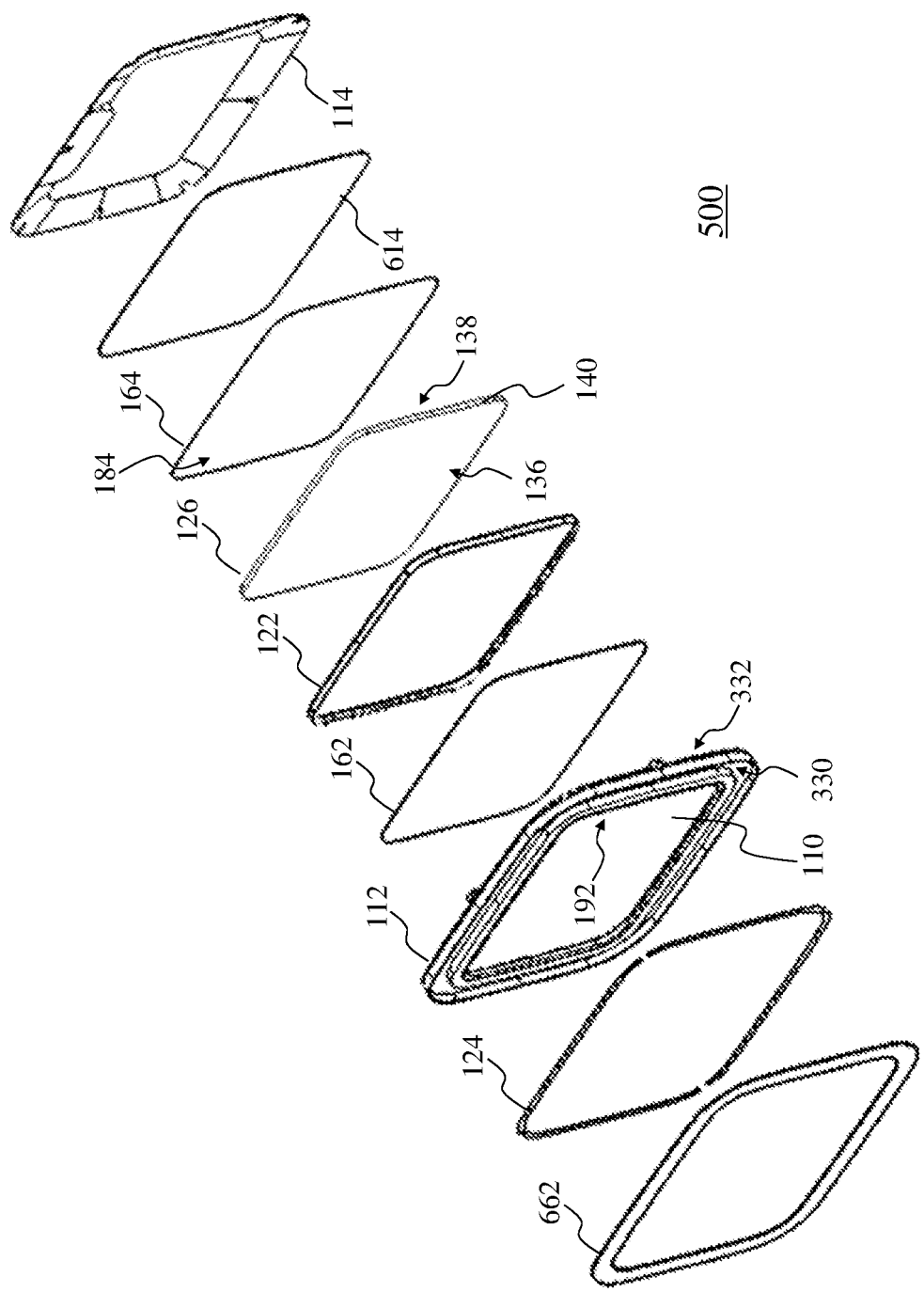
FIG. 6 shows an exploded view of the illumination panel device of FIG. 5A.

FIG. 6 shows an exploded view of the illumination panel device 500. Similar to the illumination panel device 100, the illumination panel device 500 may include a light guide 126, a first circuit board 122, a second circuit board 124, a primary diffuser 162, a reflector 164 and a power compartment 166 (not shown in FIG. 6). In addition, the illumination panel device 500 may further include a secondary diffuser 662. The secondary diffuser 662 may be shaped similarly to the second circuit board 124, to surround the lighting region 180. The illumination panel device 500 may further include an inner rear cover 614 arranged between the reflector 164 and the rear cover 114. The inner rear cover 614 may have a thickness of about 1 mm. The rear cover 114 may be partially curved, or angular, while the inner rear cover 614 may be flat. The inner rear cover 614 may be adapted to hold the light guide 126, the primary diffuser 162, and the reflector 164 in position within the illumination panel device 500. By using the inner rear cover 614, instead of the rear cover 114, to hold the internal components in place, the rear cover 114 may be fabricated without the need for internal structures adapted to secure the internal components. As a result, the rear cover 114 may be easily constructed without any aesthetic defects.

Different from the illumination panel device 100, the first circuit board 122 and the second circuit board 124 of the illumination panel device 500 may be arranged on opposite sides of the frame 512. The first circuit board 122 may be arranged on a rear end 332 of the frame 512, between the frame 512 and the rear cover 114. The second circuit board 122 may be arranged on a front end 330 of the frame 512. The secondary diffuser 662 may be arranged over the second circuit board 122. In other words, the second circuit board 122 may be disposed between the frame 512 and the secondary diffuser 662.

Like the illumination panel device 100, the illumination panel device 500 may further include a first controller circuit (not shown in the figures) and a second controller circuit (not shown in the figures). The first controller circuit may be configured to control the plurality of white light emitters 132, for example, individually control each white light emitter of the plurality of white light emitters 132. The second controller circuit may be configured to control the plurality of multi-color light emitters 134. The second controller circuit may individually control each multi-color light emitter 134 of the plurality of multi-color light emitters 134.

Figure 7:
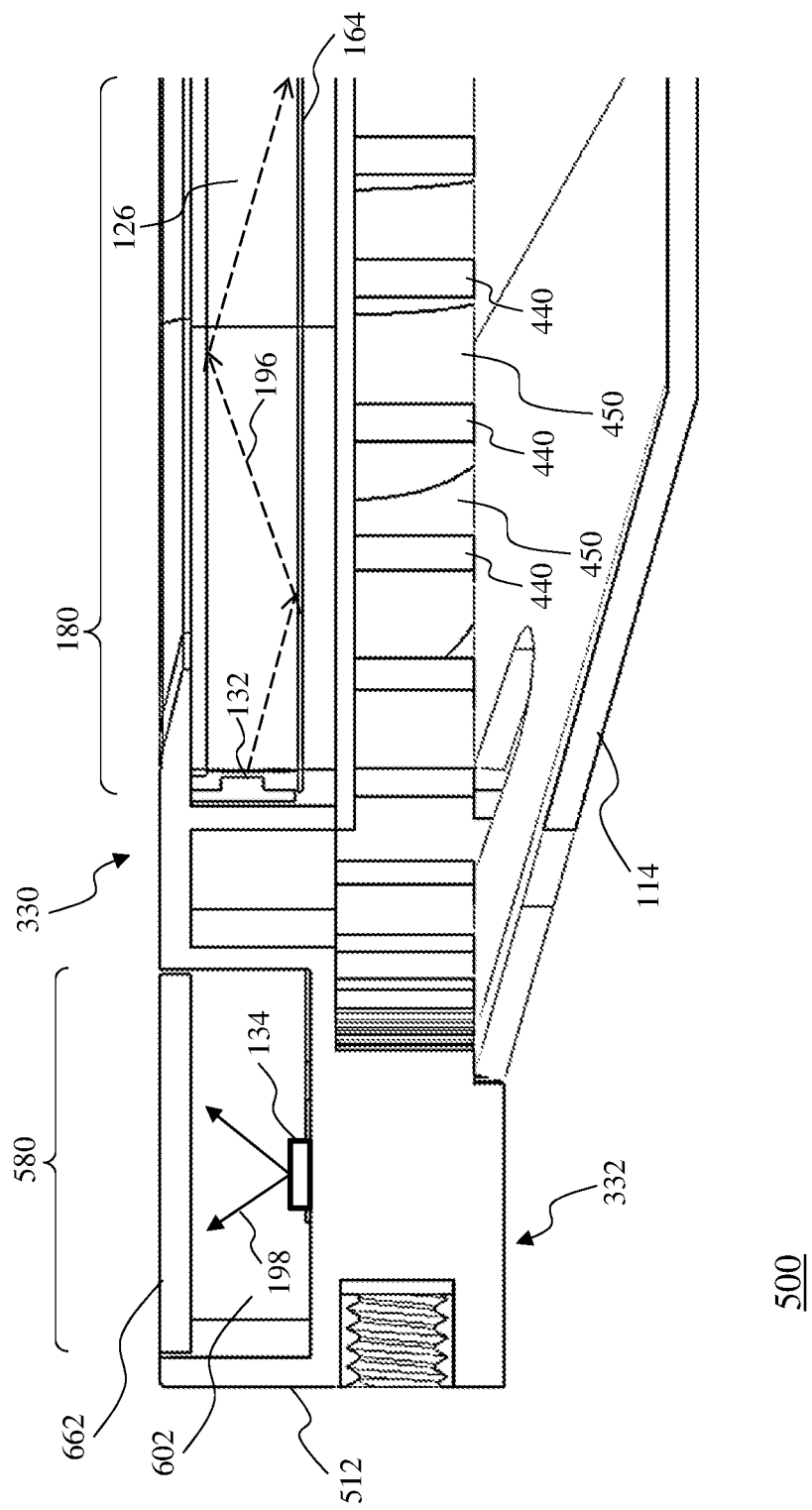
FIG. 7 shows a cross-sectional view of the illumination panel device of FIG. 5A.

FIG. 7 shows a cross-sectional view of the illumination panel device 500. The first circuit board 122 may be arranged on an inner edge of the frame 512, so that the plurality of white light emitters 132 face the peripheral edges of the light guide 126. The optical coupling between the white light emitters 132 and the light guide 126 is the same as in the illumination panel device 100, and as such, not further described herein.

The frame 512 may include a groove 602 formed on the front end 330 of the frame 512. The groove 602 may surround the lighting region 180. The second circuit board 124 and thereby, the plurality of multi-color light emitters 134, may be arranged in the groove 602. The opening of the groove 602 may be covered by the secondary diffuser 580. The second circuit board 124 may be arranged at least substantially perpendicular to the first circuit board 122, such that the plurality of multi-color light emitters 134 emit light in a direction away from the rear cover 114. The plurality of multi-color light emitters 134 may face the secondary diffuser 580, so that they emit light towards the secondary diffuser 580. The secondary diffuser 580 may be arranged over the second circuit board 124, and may be configured to diffuse light emitted by the plurality of multi-color light emitters 134. The secondary diffuser 580 may refract the colored light emitted by the multi-color light emitters 134. The refracted light may leave the secondary diffuser 580, to give the appearance of a colored border, i.e. the secondary lighting region 580, around the lighting region 180.

The rear end 332 of the frame may include a plurality of heat dissipation fins 440. The heat dissipation fins 440 may extend from the rear end 332 of the frame 112 towards the rear cover 114. There may be a gap 450 between every two heat dissipation fins 440. The gaps 450 may facilitate air flow between the plurality of heat dissipation fins 440.

Figure 8A:
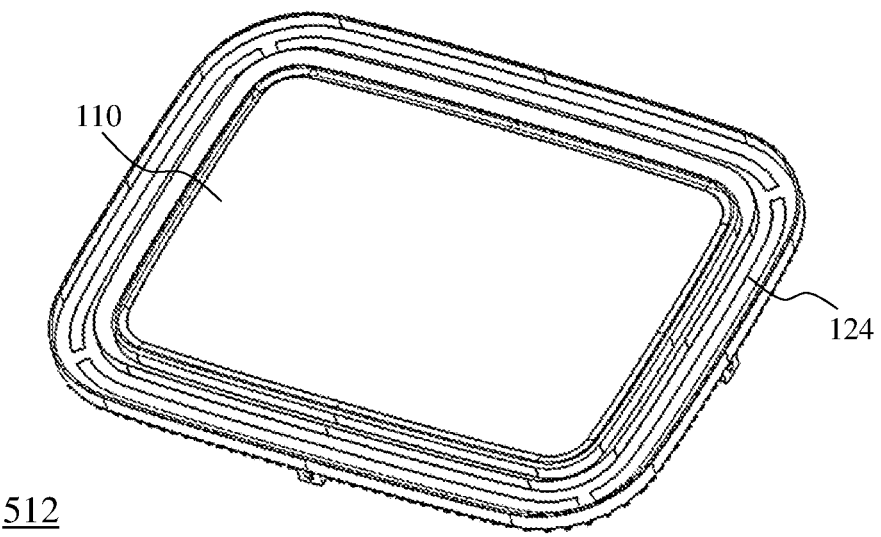
FIGS. 8A and 8B show a top perspective view and a rear perspective view of the frame of the illumination panel device of FIG. 5A, respectively.
Figure 8B:
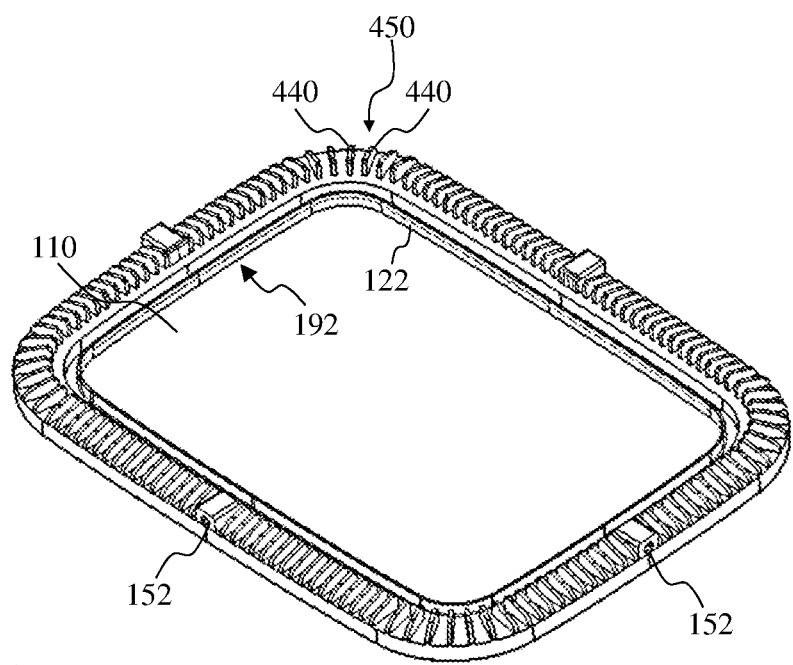

FIGS. 8A and 8B show a top perspective view and a rear perspective view the frame 512 of the illumination panel device 500, respectively. FIG. 8A shows the front end 330 of the frame 512. The second circuit board 124 may be provided on the front end 330 of the frame 512, for example, in at least one groove formed on the front end 330.

FIG. 8B shows the rear end 332 of the frame 512. The first circuit board 122 may be provided on the inner edge 192 of the frame 512. The first and second circuit boards 122, 124 may be independently operable.

According to various embodiments, the outer edge 194 of the frames 112, 512 may be at least substantially rectangular in shape. The corners of the frames 112, 512 may be rounded, to facilitate bending of the first circuit board 122 along the inner edge 192 of the frames 112, 512.

Various modifications may be made to the above-described embodiments.

Figure 9A:
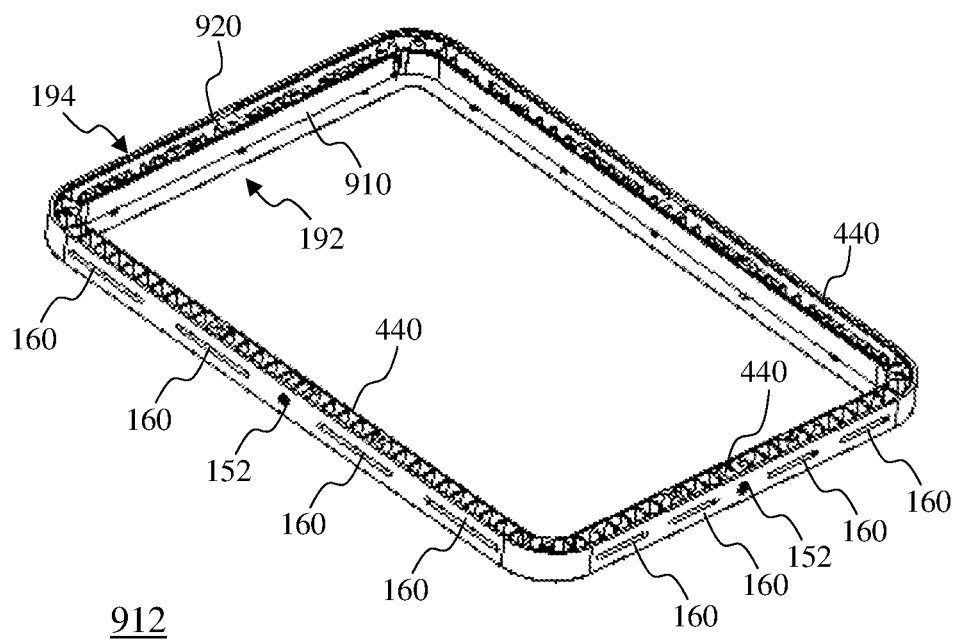
FIGS. 9A to 9C show an alternative embodiment of the frame of FIG. 4A.
Figure 9B:
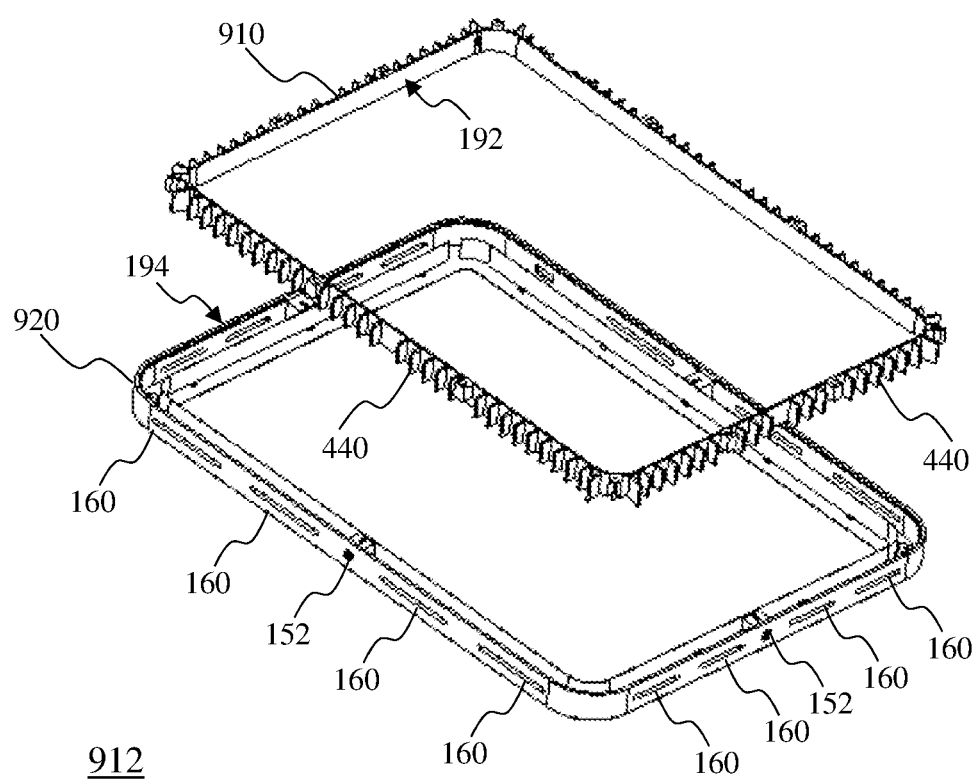
Figure 9C:
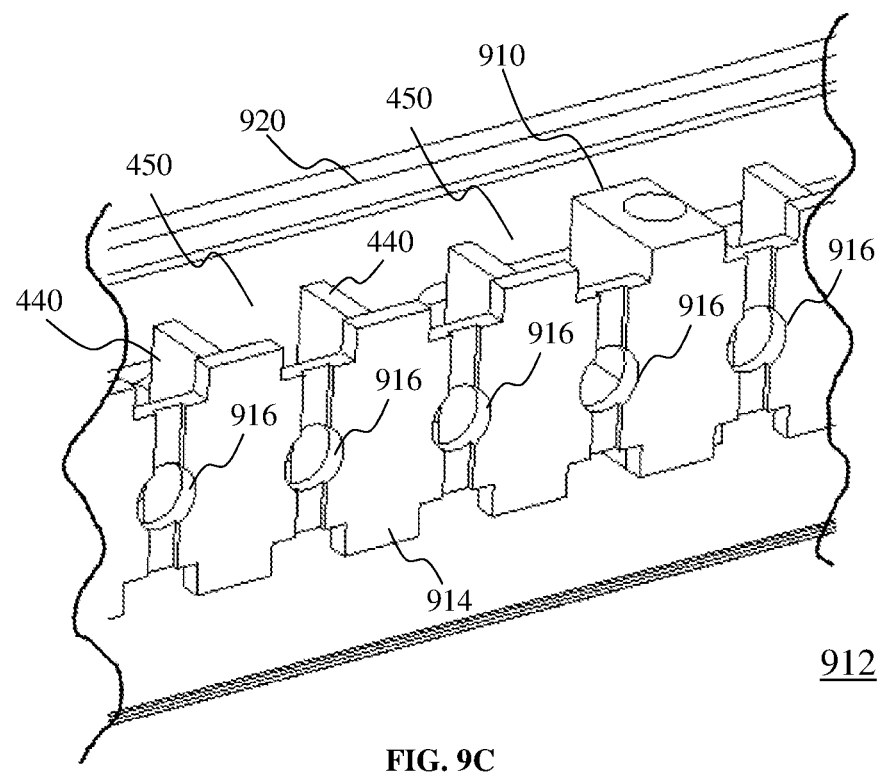

FIGS. 9A to 9C show a frame 912, which may be an alternative embodiment of the frame 112.

Referring to FIG. 9A which shows a perspective view of the frame 912, the frame 912 may be similar to the frame 112 in many aspects, for example, including air vents 160, aperture 152, and heat dissipation fins 440. Unlike the frame 112 which may be fabricated from one material, for example, a metal such as aluminum, the frame 912 may include a metal frame member 920 and a polymer frame member 910. The metal frame member 920 may surround the polymer frame member 910. The metal frame member 920 may be fitted around the polymer frame member 910. The metal frame member 920 may include the outer edge 194 of the frame 912. The polymer frame member 910 may include the edge 192 of the frame 912, that surrounds the opening 110. The metal frame member 920 may include a metal, such as aluminum, or an alloy thereof. The polymer frame member 910 may include a polymer, for example, a thermally conductive polymer. In various embodiments, the polymer frame member 910 may be an integral piece fabricated by molding a polymer material.

FIG. 9B shows a disassembled view of the frame 912. The polymer frame member 910 may include a plurality of heat dissipation fins 440. The plurality of heat dissipation fins 404 may be arranged on the outer sides of the polymer frame member 910, that face the metal frame member 920. The heat dissipation fins 440 may be spaced apart from one another such that there are gaps 450 between neighboring heat dissipation fins 440. In various embodiments, the heat dissipation fins 440 may be spaced equally apart from one another.

As compared to the frame 112 where the heat dissipation fins 440 are made of metal, the frame 912 may be slightly less efficient at removing heat with its polymer heat dissipation fins 440, but may provide the advantage of being lighter in weight. The frame 912 may also be cheaper and easier to manufacture, as compared to the frame 112.

FIG. 9C shows an enlarged view of a portion of the frame 912. The polymer frame member 910 may include a wall 914 arranged adjacent to the plurality of heat dissipation fins 440. The wall 914 may be at least substantially perpendicular to a direction between the polymer frame member 910 and the metal frame member 920. The wall 914 may have a plurality of air venting slots 916 formed therein to facilitate air flow to the gaps 450. The air venting slots 916 may be adjacent to the gaps 450. Each air venting slot 916 may be adjacent to a respective gap 450. The frame 912 may further include a plurality of stoppers 918 (shown in FIG. 10) formed on the polymer frame member 910. The stoppers 918 may be integrated on the polymer frame member 910. The plurality of stoppers 918 may serve to hold a circuit board against the wall 914. With the presence of the stoppers 918, the circuit board may be affixed to the polymer frame member 910 without any adhesive.

Figure 10:
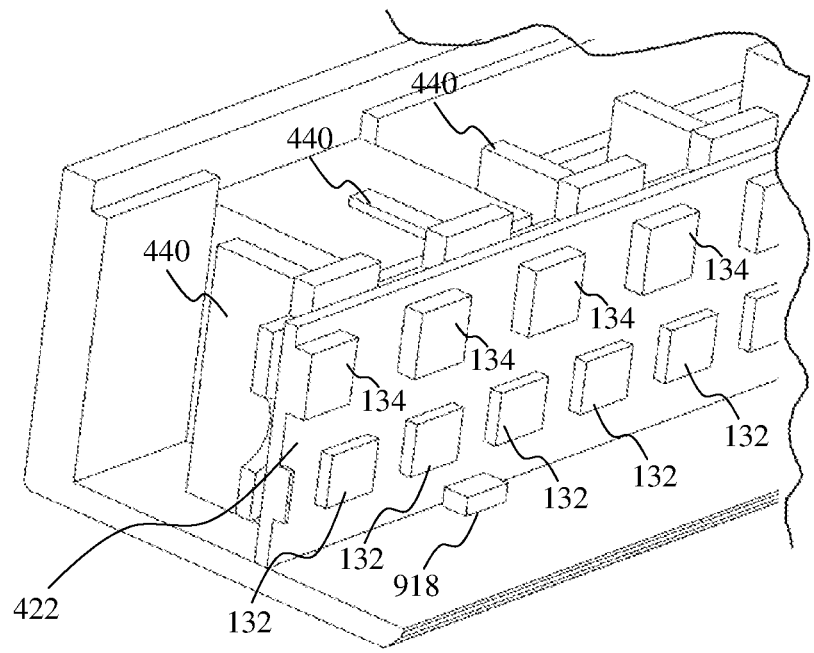
FIG. 10 shows an alternative embodiment for the arrangement of the light emitters of the illumination panel device of FIG. 1A.

FIG. 10 shows an alternative embodiment for the arrangement of the light emitters of the illumination panel device 100. In the alternative embodiment, instead of having the white light emitters 132 and the multi-color light emitters 134 provided on separate circuit boards like described above with respect to FIGS. 2 to 4B, the white light emitters 132 and the multi-color light emitters 134 may be provided on a single circuit board 422. The circuit board 422 may be coupled to the polymer frame member 910 of the frame 912 in some embodiments, or coupled to the frame 112 in other embodiments. The circuit board 422 may include a row of white light emitters 132, and a row of multi-color light emitters 134. The row of multi-color light emitters 134 may be adjacent to the row of white light emitters 132. The circuit board 422 may be coupled to the frame 112 or 912 in an arrangement such that both the row of white light emitters 132 and the row of multi-colour light emitters 134 are arranged around the opening 110.

Figure 11A:
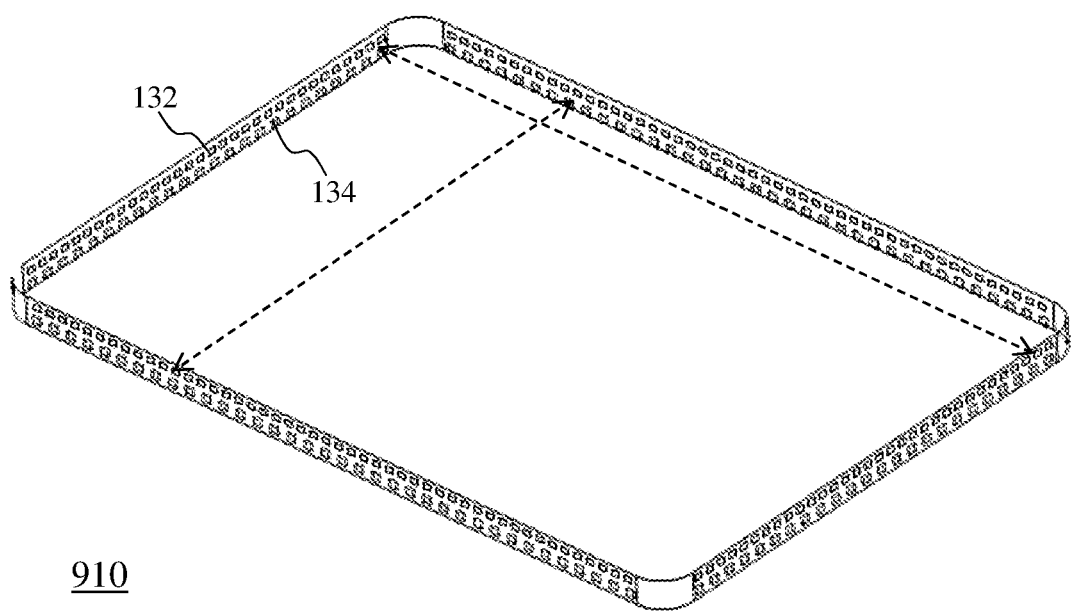
FIGS. 11A and 11B show views of a polymer frame member of the frame of FIG. 9A.
Figure 11B:
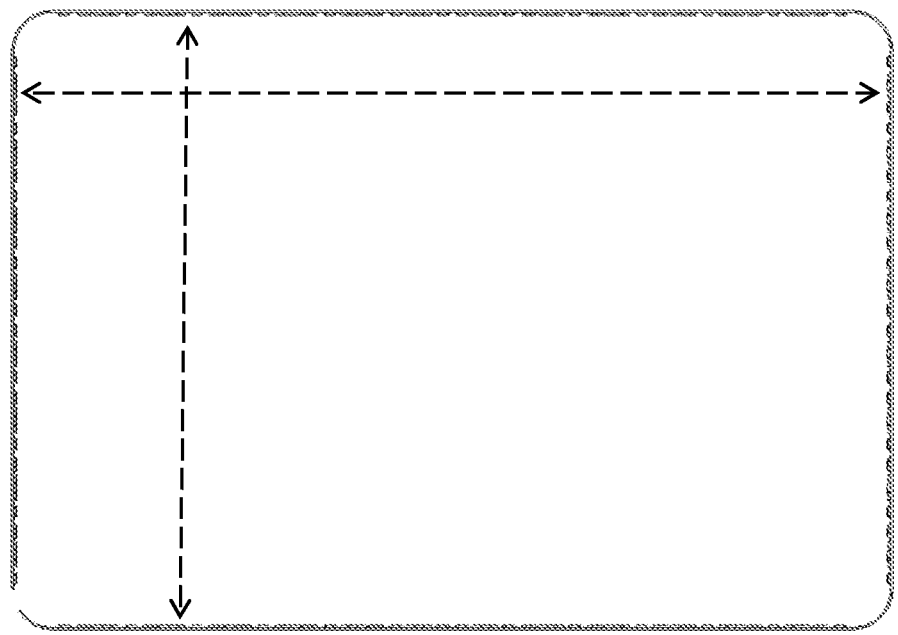

FIGS. 11A and 11B show an embodiment where the single circuit board 422 that includes both the plurality of white light emitters 132 and the plurality of multi-color light emitters 134, is coupled to the polymer frame member 910 of the frame 912. On the circuit board 422, the row of white light emitters 132 may be parallel to the row of multi-color light emitters 134. As a result, the white light emitters 132 may be arranged at a same vertical position along all four sides of the polymer frame member 910, such that the white light emitters 132 arranged on a first side of the polymer frame member 910 directly face, in other words, are vertically aligned with, the white light emitters 132 arranged on a second side of the polymer frame member 910, wherein the second side opposes the first side. The vertical direction may be defined as a direction out of the plane of the illumination panel device 100. Similarly, the multi-color light emitters 134 may be arranged at a same vertical position along all four sides of the polymer frame member 910, such that the multi-color light emitters 134 arranged on the first side of the polymer frame member 910 directly face, in other words, are vertically aligned with, the multi-color light emitters 134 arranged on the second side of the polymer frame member 910. The white light emitters 132 on opposing sides of the polymer frame member 910 may be aligned, while the multi-color light emitters 134 on opposing sides of the polymer frame member 910 may be aligned. Consequently, mixing of light emitted by the white light emitters 132 and the multi-color light emitters 134 may be minimized.

According to another alternative embodiment, the circuit board 422 may include only a plurality of combination light emitters arranged in a single row. Each combination light emitter may be configured to selectively emit white light, red light, green light, and blue light. Each combination light emitter may include a white light emitter and an RGB light emitter packaged into a single light emitter unit.

Figure 12:
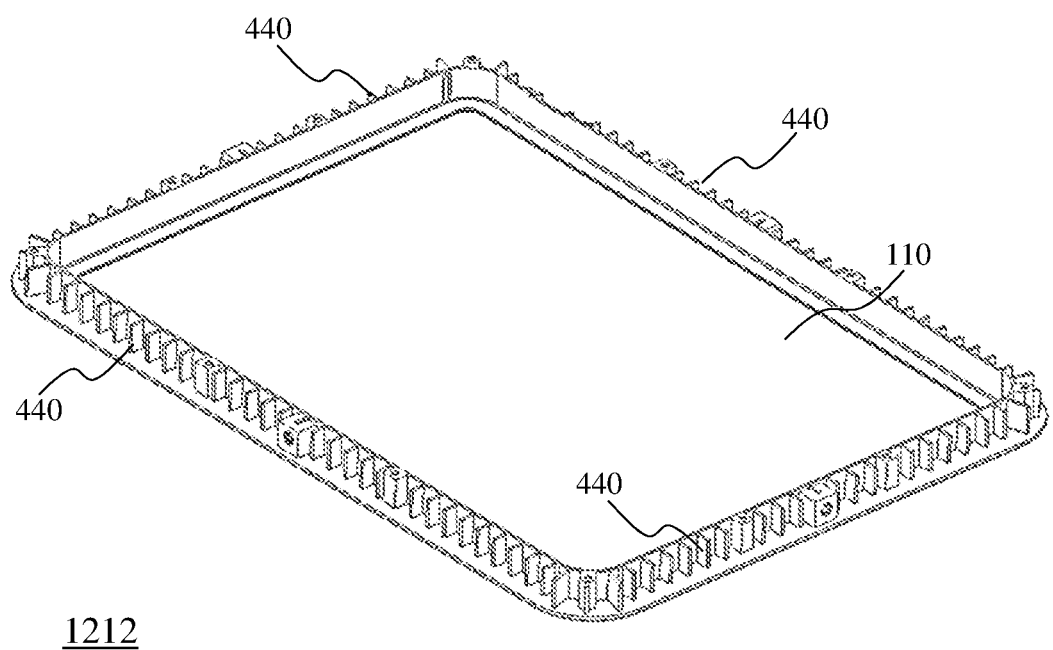
FIG. 12 shows an alternative embodiment of the frame of the illumination panel device.

FIG. 12 shows an embodiment of a frame 1212 of the illumination panel device 100 or 500. The frame 1212 may be an alternative to the frame 112. The frame 1212 may not cover the heat dissipation fins 440 of the illumination panel device 100 or 500. Consequently, the heat dissipation fins 440 may be exposed. In other words, the heat dissipation fins 440 may be formed on an external surface of the sides of the frame 1212. In this embodiment, the frame 1212 need not include air vents 160, since the heat dissipation fins 440 are directly exposed to the ambient air. The resulting frame 1212 may be smaller in height or thickness, and consequently may be lighter in weight, as compared to the frame 112. The frame 1212 may be constructed out of metal, for efficient heat dissipation.

The following examples pertain to further embodiments.

Example 1 is an illumination panel device including: a housing including a frame coupled to a rear cover, the frame defining an opening; a first circuit board including a plurality of white light emitters, the first circuit board coupled to the frame such that the plurality of white light emitters are arranged around the opening; a second circuit board including a plurality of multi-colour light emitters, the second circuit board coupled to the frame such that the plurality of multi-colour light emitters are arranged around the opening; and a light guide having opposite front and back surfaces, the light guide arranged in the opening with the back surface facing the rear cover, wherein the light guide is optically coupled to at least the plurality of white light emitters through peripheral edges of the light guide.

In example 2, the subject-matter of example 1 can optionally include the light guide is configured to receive light from at least the plurality of white light emitters through the peripheral edges and further configured to release the received light through the front and back surfaces.

In example 3, the subject-matter of any one of examples 1 to 2 can optionally include that the frame has a front end and an opposite back end, wherein the opening is smaller at the front end than at the back end.

In example 4, the subject-matter of example 3 can optionally include that the light guide is larger than the opening at the front end, such that the light guide is retained within the housing by the front end of the frame.

In example 5, the subject-matter of any one of examples 1 to 4 can optionally include that the frame includes a plurality of heat dissipation fins extending from an inner edge of the frame adjacent to the opening, to an outer edge of the frame along a perimeter of the frame, the heat dissipation fins configured to conduct heat generated by at least one of the first circuit board and the second circuit board.

In example 6, the subject-matter of example 5 can optionally include that the frame includes gaps between the plurality of heat dissipation fins to facilitate air flow, wherein the heat dissipation fins are configured to transfer the heat generated by at least one of the first circuit board and the second circuit board to air between the heat dissipation fins.

In example 7, the subject-matter of any one of examples 1 to 6 can optionally include: a reflector arranged between the light guide and the rear cover, wherein the reflector is configured to reflect light released from the back surface of the light guide towards the front surface of the light guide.

In example 8, the subject-matter of any one of examples 1 to 7 can optionally include: a primary diffuser arranged adjacent to the light guide in the opening of the frame, wherein the primary diffuser is configured to diffuse light released from the front surface of the light guide.

In example 9, the subject-matter of any one of examples 1 to 8 can optionally include that the first circuit board is arranged on an inner edge of the frame that surrounds the opening, such that the plurality of white light emitters face the peripheral edges of the light guide.

In example 10, the subject-matter of any one of examples 1 to 9 can optionally include: a first controller circuit configured to control the plurality of white light emitters; and a second controller circuit configured to control the plurality of multi-colour light emitters.

In example 11, the subject-matter of example 10 can optionally include that the second controller circuit is configured to individually control each multi-colour light emitter of the plurality of multi-colour light emitters.

In example 12, the subject-matter of any one of examples 1 to 11 can optionally include that the plurality of white light emitters includes light emitting diodes configured to emit white light.

In example 13, the subject-matter of any one of examples 1 to 12 can optionally include that the plurality of multi-colour light emitters includes red-green-blue light emitting diodes.

In example 14, the subject-matter of any one of examples 1 to 13 can optionally include: a power source coupled to the rear cover, wherein the power source is configured to supply electrical power to each of the first circuit board and the second circuit board.

In example 15, the subject-matter of any one of examples 1 to 14 can optionally include: an electrical cable connecting the power source to each of the first circuit board and the second circuit board, wherein the electrical cable is arranged between the reflector and the rear cover.

In example 16, the subject-matter of any one of examples 1 to 15 can optionally include that the second circuit board is arranged on an inner edge of the frame, such that the plurality of multi-colour light emitters emit light towards the peripheral edges of the light guide.

In example 17, the subject-matter of example 16 can optionally include that the second circuit board is arranged adjacent to the first circuit board on the inner edge of the frame.

In example 18, the subject-matter of any one of examples 1 to 17 can optionally include that the second circuit board is arranged at least substantially perpendicular to the first circuit board, such that the plurality of multi-colour light emitters emit light in a direction away from the rear cover.

In example 19, the subject-matter of any one of examples 1 to 18 can optionally include that the frame includes at least one groove, wherein the second circuit board is provided in the at least one groove.

In example 20, the subject-matter of any one of examples 1 to 19 can optionally include: a secondary diffuser arranged over the second circuit board, wherein the secondary diffuser is configured to diffuse light emitted by the plurality of multi-colour light emitters.

Example 21 is an illumination panel device including: a housing including a frame coupled to a rear cover, the frame defining an opening; a circuit board including a row of white light emitters and an adjacent row of multi-colour light emitters, wherein the circuit board is coupled to the frame such that both the row of white light emitters and the row of multi-colour light emitters are arranged around the opening; a light guide having opposite front and back surfaces, the light guide arranged in the opening with the back surface facing the rear cover, wherein the light guide is optically coupled to at least the plurality of white light emitters through peripheral edges of the light guide.

In example 22, the subject-matter of example 21 can optionally include that the light guide is configured to receive light from at least the plurality of white light emitters through the peripheral edges and further configured to release the received light through the front and back surfaces.

In example 23, the subject-matter of any one of examples 21 to 22 can optionally include that the frame has a front end and an opposite back end, wherein the opening is smaller at the front end than at the back end.

In example 24, the subject-matter of example 23 can optionally include that the light guide is larger than the opening at the front end, such that the light guide is retained within the housing by the front end of the frame.

In example 25, the subject-matter of any one of examples 21 to 24 can optionally include that the frame includes a polymer frame member surrounded by a metal frame member, the polymer frame member including a plurality of heat dissipation fins configured to conduct heat generated by the circuit board.

In example 26, the subject-matter of example 25 can optionally include that the polymer frame member further includes a wall arranged adjacent to the plurality of heat dissipation fins, the wall having a plurality of air venting slots formed therein to facilitate air flow to gaps between the plurality of heat dissipation fins.

In example 27, the subject-matter of example 26 can optionally include that the polymer frame member includes a plurality of stoppers adapted to hold the circuit board against the wall.

In example 28, the subject-matter of any one of examples 21 to 27 can optionally include: a reflector arranged between the light guide and the rear cover, wherein the reflector is configured to reflect light released from the back surface of the light guide towards the front surface of the light guide.

In example 29, the subject-matter of any one of examples 21 to 28 can optionally include: a primary diffuser arranged adjacent to the light guide in the opening of the frame, wherein the primary diffuser is configured to diffuse light released from the front surface of the light guide.

In example 30, the subject-matter of any one of examples 21 to 29 can optionally include: a first controller circuit configured to control the plurality of white light emitters; and a second controller circuit configured to control the plurality of multi-colour light emitters.

In example 31, the subject-matter of example 30 can optionally include that the second controller circuit is configured to individually control each multi-colour light emitter of the plurality of multi-colour light emitters.

In example 32, the subject-matter of any one of examples 21 to 31 can optionally include that the plurality of white light emitters includes light emitting diodes configured to emit white light.

In example 33, the subject-matter of any one of examples 21 to 32 can optionally include that the plurality of multi-colour light emitters includes red-green-blue light emitting diodes.

In example 34, the subject-matter of any one of examples 21 to 33 can optionally include: a power source coupled to the rear cover, wherein the power source is configured to supply electrical power to the circuit board.

In example 35, the subject-matter of example 34 can optionally include: an electrical cable connecting the power source to the circuit board, wherein the electrical cable is arranged between a reflector and the rear cover.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The claims are not intended to be limited to the aspects shown herein, but is to be accorded the full scope consistent with the language claims, wherein reference to an element in the singular is not intended to mean "one and only one"

unless specifically so stated, but rather "one or more." Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An illumination panel device comprising:
   a housing comprising a frame coupled to a rear cover, the frame defining an opening;
   a first circuit board comprising a plurality of white light emitters, the first circuit board coupled to the frame such that the plurality of white light emitters are arranged around the opening;
   a second circuit board comprising a plurality of multi-colour light emitters, the second circuit board coupled to the frame such that the plurality of multi-colour light emitters are arranged around the opening; and
   a light guide having opposite front and back surfaces, the light guide arranged in the opening with the back surface facing the rear cover, wherein the light guide is optically coupled to at least the plurality of white light emitters through peripheral edges of the light guide, wherein the frame comprises a polymer frame member surrounded by a metal frame member, the polymer frame member comprising a plurality of heat dissipation fins configured to conduct heat generated by the circuit board, wherein the polymer frame member further comprises a wall arranged adjacent to the plurality of heat dissipation fins, the wall having a plurality of air venting slots formed therein to facilitate air flow to gaps between the plurality of heat dissipation fins.

2. The illumination panel device of claim 1, wherein the frame has a front end and an opposite back end, wherein the opening is smaller at the front end than at the back end.

3. The illumination panel device of claim 2, wherein the light guide is larger than the opening at the front end, such that the light guide is retained within the housing by the front end of the frame.

4. The illumination panel device of claim 1, further comprising:
   a power source coupled to the rear cover, wherein the power source is configured to supply electrical power to each of the first circuit board and the second circuit board.

5. The illumination panel device of claim 4, further comprising: an electrical cable connecting the power source to each of the first circuit board and the second circuit board, wherein the electrical cable is arranged between a reflector and the rear cover.

6. The illumination panel device of claim 1, wherein the light guide is configured to receive light from at least the plurality of white light emitters through the peripheral edges and further configured to release the received light through the front and back surfaces.

7. The illumination panel device of claim 1, further comprising:
   a reflector arranged between the light guide and the rear cover, wherein the reflector is configured to reflect light released from the back surface of the light guide towards the front surface of the light guide.

8. The illumination panel device of claim 1, further comprising:
   a primary diffuser arranged adjacent to the light guide in the opening of the frame, wherein the primary diffuser is configured to diffuse light released from the front surface of the light guide.

9. The illumination panel device of claim 1, wherein the first circuit board is arranged on an inner edge of the frame that surrounds the opening, such that the plurality of white light emitters face the peripheral edges of the light guide.

10. The illumination panel device of claim 1, further comprising: a first controller circuit configured to control the plurality of white light emitters; and
    a second controller circuit configured to control the plurality of multi-colour light emitters, wherein the second controller circuit is configured to individually control each multi-colour light emitter of the plurality of multi-colour light emitters.

11. The illumination panel device of claim 1, wherein the plurality of white light emitters comprises light emitting diodes configured to emit white light.

12. The illumination panel device of claim 1, wherein the plurality of multi-colour light emitters comprises red-green-blue light emitting diodes.

13. The illumination panel device of claim 1, wherein the second circuit board is arranged on an inner edge of the frame, such that the plurality of multi-colour light emitters emit light towards the peripheral edges of the light guide, and wherein the second circuit board is arranged adjacent to the first circuit board on the inner edge of the frame.

14. The illumination panel device of claim 1, wherein the second circuit board is arranged at least substantially perpendicular to the first circuit board, such that the plurality of multi-colour light emitters emit light in a direction away from the rear cover.

15. The illumination panel device of claim 1, wherein the frame comprises at least one groove, wherein the second circuit board is provided in the at least one groove.

16. The illumination panel device of claim 1, further comprising:
    a secondary diffuser arranged over the second circuit board, wherein the secondary diffuser is configured to diffuse light emitted by the plurality of multi-colour light emitters.

17. An illumination panel device comprising:
    a housing comprising a frame coupled to a rear cover, the frame defining an opening;
    a circuit board comprising a row of white light emitters and an adjacent row of multi-colour light emitters, wherein the circuit board is coupled to the frame such that both the row of white light emitters and the row of multi-colour light emitters are arranged around the opening; and
    a light guide having opposite front and back surfaces, the light guide arranged in the opening with the back surface facing the rear cover, wherein the light guide is optically coupled to at least the row of white light emitters through peripheral edges of the light guide, wherein the frame comprises a polymer frame member surrounded by a metal frame member, the polymer frame member comprising a plurality of heat dissipation fins configured to conduct heat generated by the circuit board, wherein the polymer frame member further comprises a wall arranged adjacent to the plurality of heat dissipation fins, the wall having a plurality of air venting slots formed therein to facilitate air flow to gaps between the plurality of heat dissipation fins.

18. The illumination panel device of claim 17, wherein the polymer frame member comprises a plurality of stoppers adapted to hold the circuit board against the wall.

19. The illumination panel device of claim 17, wherein the polymer frame member comprises a plurality of stoppers adapted to hold the circuit board against the wall.

* * * * *